Figure 4:
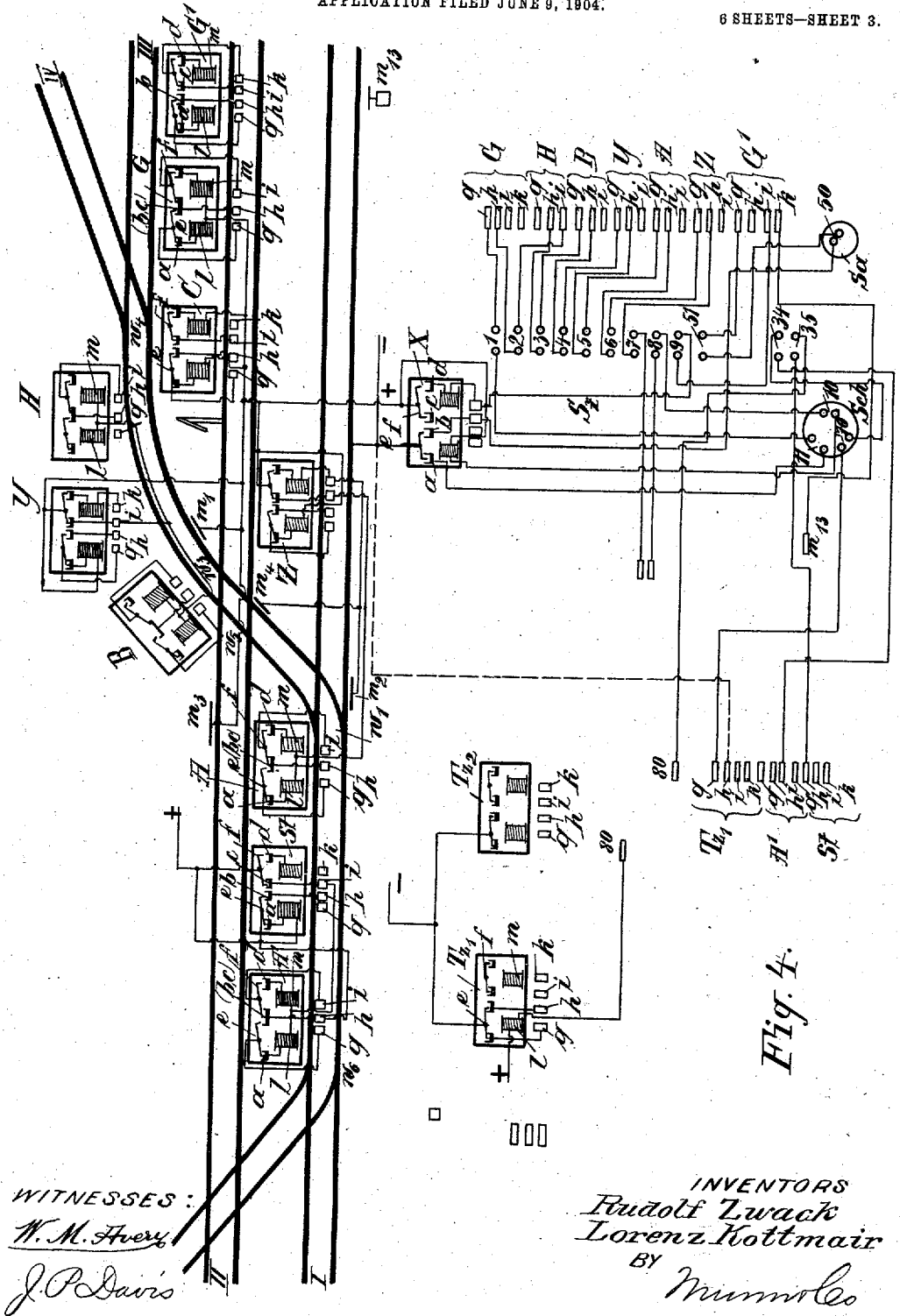

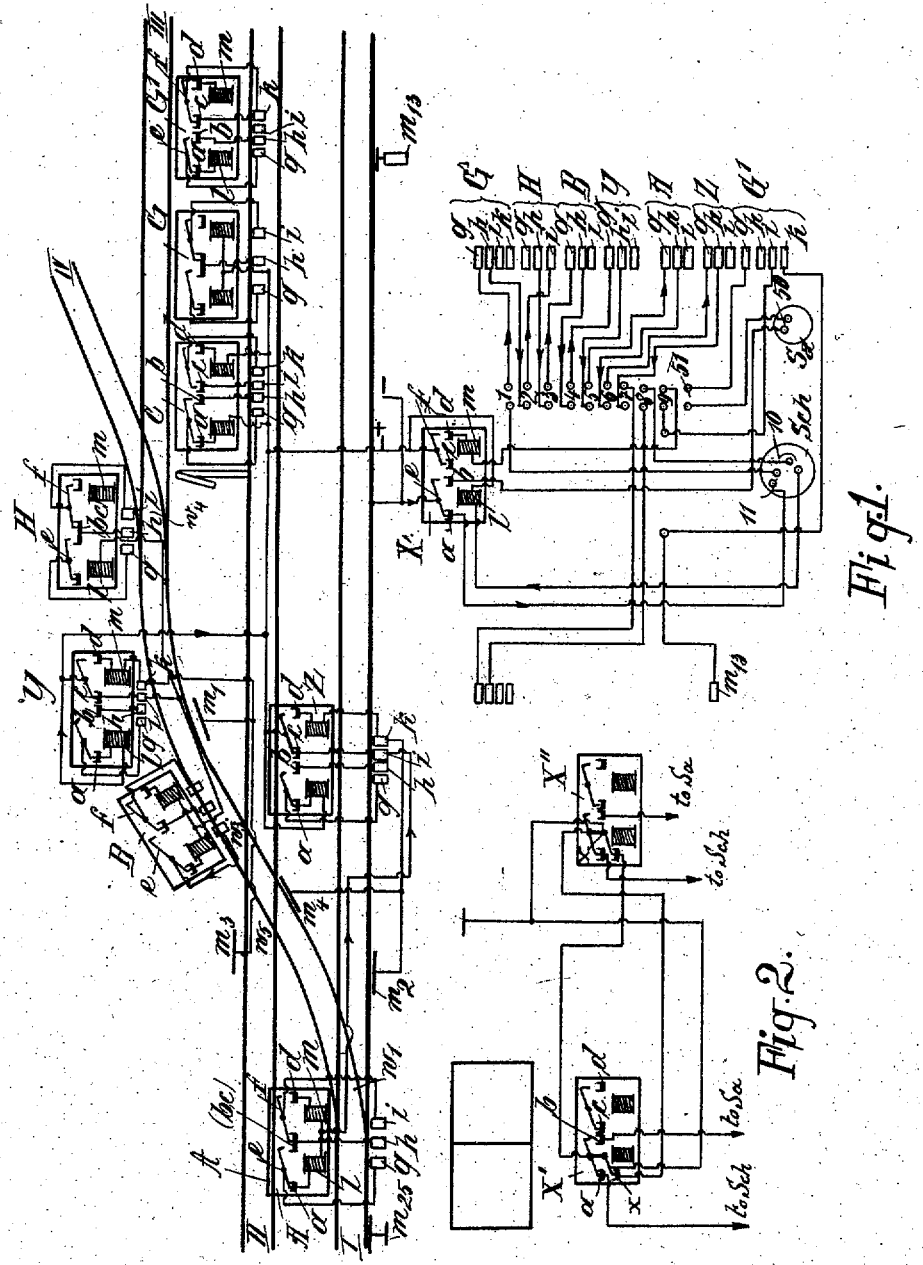

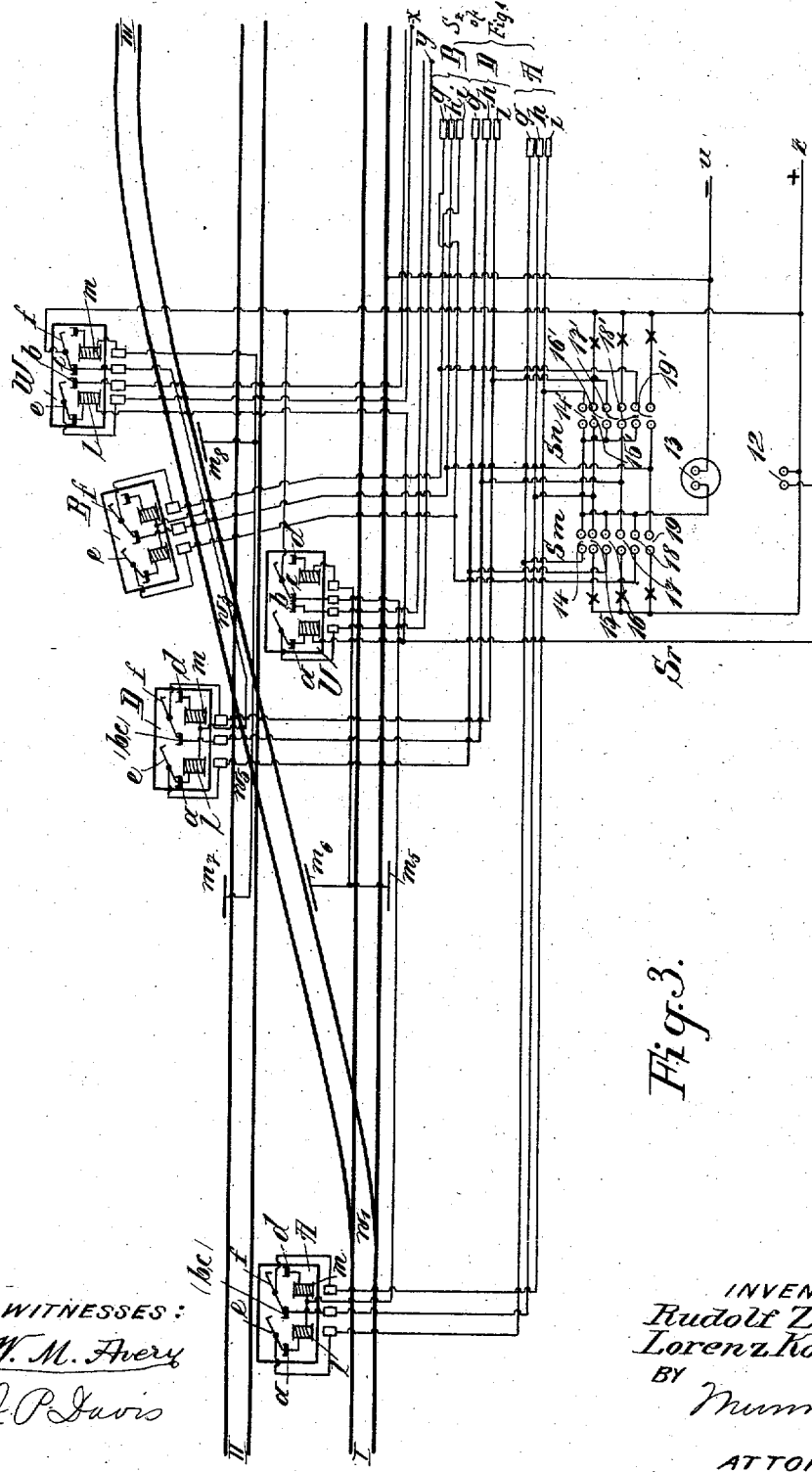

No. 883,646. PATENTED MAR. 31, 1908.
L. KOTTMAIR & R. ZWACK.
SAFETY DEVICE FOR ELECTRIC POINT SHIFTING, SIGNALING, LOCKING, AND SWITCHING APPARATUS.
APPLICATION FILED JUNE 9, 1904.
6 SHEETS—SHEET 4.
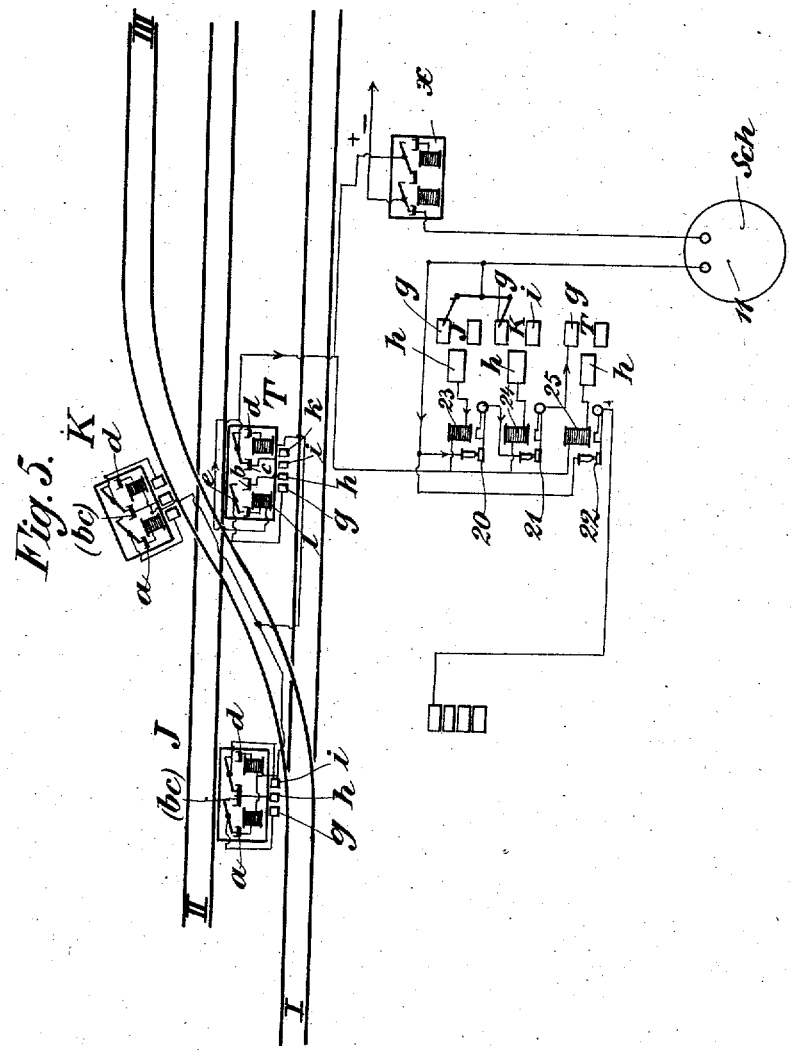
Witnesses:
W. M. Avery
A. H. Davis
Inventors
Rudolf Zwack
Lorenz Kottmair
By
Attorneys.

No. 883,646.
PATENTED MAR. 31, 1908.
L. KOTTMAIR & R. ZWACK.
SAFETY DEVICE FOR ELECTRIC POINT SHIFTING, SIGNALING, LOCKING, AND SWITCHING APPARATUS.
APPLICATION FILED JUNE 9, 1904.
6 SHEETS—SHEET 5.
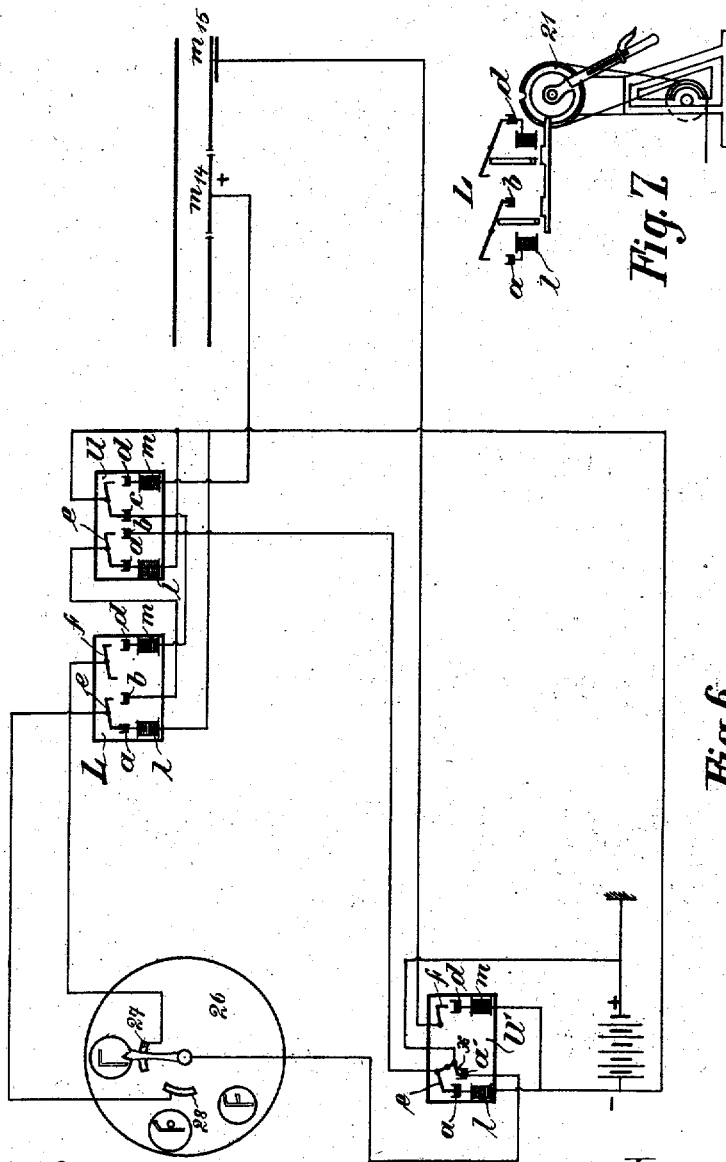

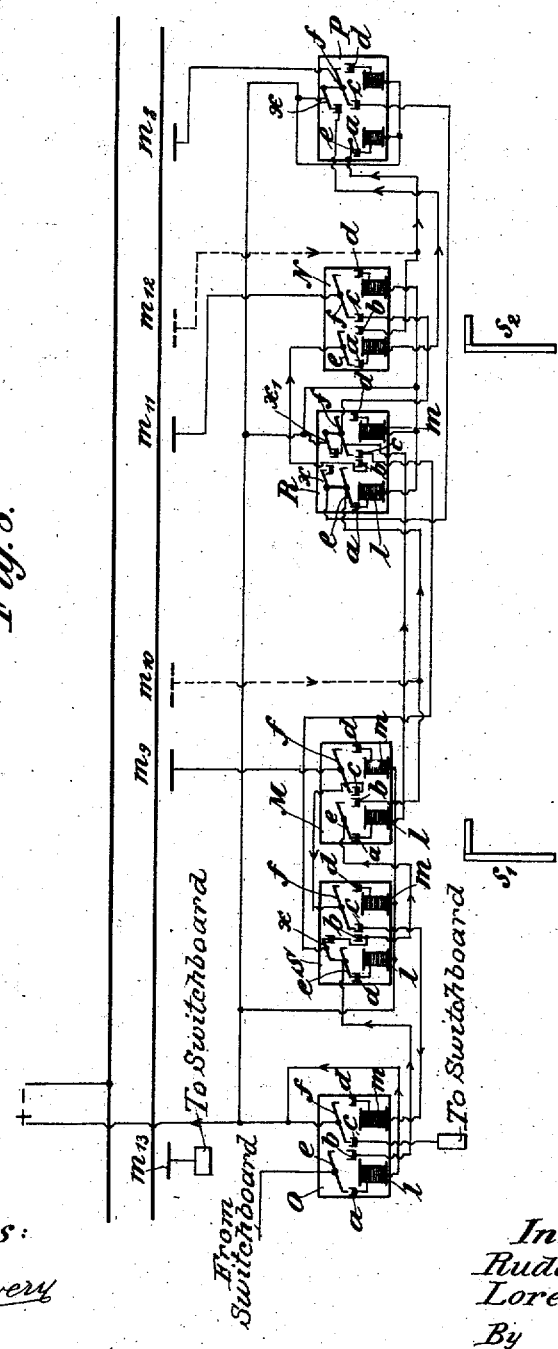

UNITED STATES PATENT OFFICE.

LORENZ KOTTMAIR, OF MUNICH, AND RUDOLF ZWACK, OF NORDENDORF, NEAR AUGSBURG, GERMANY.

SAFETY DEVICE FOR ELECTRIC POINT SHIFTING, SIGNALING, LOCKING, AND SWITCHING APPARATUS.

No. 883,646. Specification of Letters Patent. Patented March 31, 1908.

Application filed June 9, 1904. Serial No. 211,837.

*To all whom it may concern:*

Be it known that we, LORENZ KOTTMAIR, resident of Munich, Bavaria, and RUDOLF ZWACK, resident of Nordendorf, near Augsburg, Bavaria, Germany, both subjects of the King of Bavaria, have invented certain new and useful Improvements in a Safety Device for Electric Point Shifting, Signaling, Locking, and Switching Apparatus, of which the following is a specification.

The subject of the present invention is a safety-device for electric shifting or adjusting apparatus, such as point-shifting, signal-shifting, locking and switching-apparatus.

The essential feature of the invention consists in providing safety-switches which act, in connection with the shifting devices to be secured, in the following manner: If the point-shifting device, or other shifting device, is put into the position in which it is to be secured, it closes a circuit automatically and directly or by means of intermediate adjusting-devices, whereby a shifting of the safety switch is effected. During this shifting the safety switch breaks the lead or leads of the point-shifting device or the like, by which a displacing of the latter into a dangerous position might take place. Only when the safety-switch is shifted back into its original position, which as a rule is effected by a contact, the broken circuit is closed and the point shifting device can again be shifted.

The new principle may be explained as follows: A device A shifts, by closing a contact, an independent device B, and the device B breaks the circuits of the device A. The safety-switches and the shifting devices may be arranged in many different ways. One safety-switch may belong to one or several shifting devices or also several safety-switches to one or several shifting-devices. Also the safety-switches can in their turn be secured by special safety-switches, when the mutual action of the devices will be exactly the same as the one just described. In this case a combined series-connection is the result. It is immaterial whether the shifting-devices act upon each other in series, so that one after having been completely shifted shifts the next, or whether they are connected in multiple (as with the usual installations with the slide-rule-system) and thus work simultaneously. In all cases however the shifting of the safety-switch must be effected automatically and directly or by means of intermediate devices from the devices to be secured. The principle of series-connection thus finds always its application here. Generally speaking there are two circuits by means of which railway shifting- and switching devices are shifted in one direction or the other. The arrangement may be made that one of these leads, or also both, (or one for both circuits in common) is broken by the shifting of the safety-switch. While the new interruption of the circuit takes place other interruptions may take place at the same moment (in the switch-board, the ranging board and the railway slides) or real circuits may be broken.

The new safety switches can be used for stations as well as along the line. The various uses of the same will be described in the following and illustrated by drawings.

The term safety-switch used for the sake of brevity in the following description always implies that there is between this device and the shifting device to be secured the above, in paragraph 2, described relation.

Figure 1 of the drawing shows a part of a railway station. It is a two-track line (track I and II) with a turn-out track III in the station and a branch off track IV. The system of switching shown in this figure is of that kind in which, after a distributing-switch being closed by a station official, a shifting device switches on the next one and so on, one after the other, in succession. This we will call "series connection." Such a distributing-switch is described in the American specification No. 164,205 of July 3rd 1903 and is by the same inventor. Fig. 2 of the drawing shows the mode of switching of the safety-switches for a double track line. Fig. 3 shows the interdependence of point-shifting and ranging through the safety-switch. The circuits are the same as in Figs. 1 and 2. Fig. 4 shows the arrangement of the safety switching devices for distributing-switches and for lines with several branches with only one distributing-switch for each line. Fig. 5 explains the application of safety switches for such point-shifting plants in which the shifting is effected simultaneously, therefore by a connection in multiple. Figs. 6 and 7 illustrate the application of the safety-switch with locking devices for signal- and point-shifting works. Fig. 8 shows the use of the safety-switch with block-systems.

Similar letters refer to similar parts throughout the several views.

In the following description the shifting-devices for the points and signals are marked with the letters A—N, the safety switches with the letters O—Z.

The shifting-devices and safety-switches are only shown in diagrams. The construction of the same may be of the kind shown in the above mentioned American application No. 164205, and in the present case mercury-cups are used for establishing the connection. Each switching device has two electromagnet-coils $l$ and $m$. If the current passes through coil $l$, the shifting-device is shifted toward one side, so that the contact-levers $e$ and $f$ dip into the contact-cups $b$ and $d$; if however the current passes through the coil $m$, the shifting device is turned toward the other side, so that the contact-levers $e$ and $f$ dip into the other contact-cups $a$ and $c$. The coils, contact-cups and levers of the different shifting devices are connected with each other and with the station switching device, as shown in the drawing. Some safety-switches R P S of Fig. 8 have besides the contact-levers $e$ and $f$ a number of "insulating-contacts" $x$—$x_1$. The contact levers are arranged on the same shaft as the contact-levers $e, f$ and are shifted simultaneously with the same. As they would be covered by the other contact-levers if drawn in their real position, they are represented in the drawing one above the other.

On shifting any of the devices an adjusting or shifting-lever (not in the drawing) is shifted towards the right or left, as represented in the above-mentioned application No. 164205. This adjusting-lever engages with the bars of the points- or signal-shifting devices. The point-switches are therefore either shifted to the right or left, according to whether the current passes through one or the other coil. Click and ratchet-wheels of the usual kind may secure the switches and signals in the positions in which they are to remain.

In Fig. 1 of the drawing there are 1—9 interruptions of a "distributing-switch" S$z$ in the switch-board of the station. All interruptions are closed by a common contact-beam, if the official wishes to switch on a certain track, as shown in the application No. 164205. The interruptions shown here serve for the point-shifting of track III. The contact beam is so constructed that on the same being inserted the interruptions 1, 2, 3 etc. are closed, but the single interruptions remain insulated from each other.

10 and 11 are interruptions of the "all right" signal bell-push S$ch$. This is a bell push which requires to be pressed after inserting the distributing-switch, in order to close the contacts 10 and 11, only when this is done is the circuit serving to switch the shifting-devices perfectly closed and the track III is opened.

The safety-switch X is at the station, $y$ and Z are on the line.

G is the device for shifting the train-leaving-signal on track III from the position of rest to the position signaling: "Stop" and back. H the device for shifting the switch W$^4$, A for the switch W$^1$ and C for the train-leaving signal for track II, B for the switch W$^3$.

G$^1$ is the shifting-device for the leaving-signal of the third track from the stopping to the starting position and back, and S$a$ is a bell-push for the leaving-signal corresponding with the bell-push S$ch$ for the arriving signal.

$g, h, i, k$ are terminals on the shifting-devices and safety switches for connecting them with the lead-wires. The connections between the terminals of the switch-board at the station and the different apparatus are not drawn, in order not to overload the drawing and make it confusing, but the groups of terminals of the switch-board belonging together are marked with the names of the shifting-devices, so that the connection can be easily seen.

As the levers $e$ and $f$ may be in two positions, we will, for the sake of brevity, call the position shown in the drawing (in which the contacts $a$ and $c$ are closed) the $(+)$ position, the second position the $(-)$ position.

We will now describe the path of the current and the working of the devices for the case of shifting the points of track III, and will suppose that all the devices are in the $(+)$ position. The mode of working will be best seen from the paths of the currents. For the sake of simplicity the designations used in the following are as brief as possible.

The station official closes, by pressing down the contact beam, the interruptions 1—9 of the distributing-switch S$z$ and presses upon the arriving - signal push S$ch$. The current then travels as follows: From the negative pole of the battery to the safety switch X, lever $e$, contact $a$—, arriving-signal push S$ch$, contact 11, distributing-switch S$z$, contact 1— to the terminal $g$ of the sign apparatus or indicator G, terminal $g$, lever $e$, coil $l$, to $+$ pole. The apparatus G is reversed, and thus the sign or signal comes to the stop position. A new current is established through lever $e$, apparatus G, contact $b$, terminal $h$, contact 2 of switch S$z$ to terminal $i$ of switch shifting apparatus H. This apparatus is in its normal position. The current therefore goes from terminal $i$ through contact lever $f$, contact $b, c$, to terminal $h$ and contact 3 of the distributing - switch S$z$—, apparatus B, terminal $g$, lever $e$, contact $a$, coil $l$—, safety-switch Y, terminal $i$, contact $c$, lever $f$— to the positive pole of the line. Shifting device B is reversed into the (—) position. New path of current from lever e of the shifting-device B, contact b, c, terminal h—, distributing-switch Sz, contact 4—, safety-switch Y, terminal g lever e contact a, coil l— positive pole of the line. Safety-switch Y is reversed into the (—) position and thereby is interrupted the current leading from the coils l and m of the shifting device B to the terminal i of the safety-switch Y. As the coils are thus cut off from the positive pole a reversing of the shifting device B cannot be effected by the station-official nor by the train ranger, before the safety-switch Y is back in its former position. To this terminal i of the safety-switch Y may be connected the respective leads of the shifting-devices G and H—, this is shown in the figure for the sign-shifting device C. This connection is shown in the drawing, so that also these are secured against being reversed until the safety switch Y has returned into its original position.

Through the reversing of the safety-switch Y into the (—) position there is formed a new circuit: lever e, contact b, terminal h—, distributing-switch Sz, contact 5—, shifting-device A, terminal g, lever e contact a, coil l, safety-switch Z, terminal i, contact c, lever f—; positive pole. Shifting-device A is reversed into the (—) position. Through this is formed a new circuit through lever e of the shifting device A (contact b c) terminal h—, distributing switch Sz—, contact 6—, safety-switch Z, terminal g, lever e, contact a, coil l— positive pole. Safety-switch Z has returned into the (—) position and a new circuit is formed: from lever e, contact b, terminal h—, distributing-switch Sz, contact 7— to the terminals on the left of another shifting-apparatus (arrival-signal) distributing switch Sz, contact 8—, arrival signal push Sch, contact 10— safety-switch X, coil l, positive pole. Such safety-switches may be put in anywhere where it appears necessary, so that all the shifting-devices of a line may be secured by a single safety-switch, or groups of shifting-devices by a corresponding number of safety-switches. A shifting device may be secured against being reversed in either direction by the same safety-switch, as will be seen from the combination of the shifting-device C with the safety-switch Y.

Through the reversing of the safety-switch Z the shifting-device A is secured against being reversed or shifted, through the reversing of the safety-switch X the whole track, as the negative lead is interrupted at contact a of safety-switch X. For shifting back the safety-switches X, Y and Z into their (+) position, rail switches $m^{13}$ $m^1$ $m^3$ $m^2$ $m^4$ may be used and closed by the last carriage of the train.

Through the reversing of the safety-switch X is formed, when the leaving-signal push Sa is closed with the interruption 50, a new circuit: Safety-switch X, lever e, contact b— leaving-signal-push, interruption 50— interruption 51 of the distributing-switch over any number of point-shifting switches and safety-switches, sign-shifting-devices $G^1$, lever e, contact a, coil l, positive pole. Shifting-device $G^1$ is reversed and can thereby shift back to the (—) position a safety-switch which through the ringing-off of the official was shifted into the (+) position.

By bridging over the contact $m^{13}$ the current will flow over terminal k of the shifting-device $G^1$, lever f contact d, coil m to + pole. Thereby $G^1$ is reversed, a current is formed over lever f, contact c, terminal i contact 9 of the distributing-switch Sz to the coil m of safety-switch X, contact d, lever f + pole. Between the devices $G^1$ and X various other shifting-devices with different functions may be intercalated.

Safety-switch Y not only serves to safeguard track III but also, at the same time, track II, that is to say, it protects the crossing formed by tracks II and III; in the same manner Z protects, with its two contacts $m^2$ on track I and $m^4$ on track III, the point shifting-switch $W^1$.

As the safety-switches Y and Z in their reversed position prevent a reversing or shifting of any number of signals as well as of any number of point-shifting switches, until the train has quite passed the respective crossing point, the crossing-points of the most complicated point shiftings may be perfectly protected.

By this arrangement of the safety-switches Y, Z, X, the movement of the trains in large stations is greatly facilitated and far more than by the present sliding rule system D. As already described the safety-switch X for signals is shifted by the safety-switches and breaks thereby those circuits of the safety-switches for the point shifting switches by which its own shifting was effected. As the contacts for the reversing of the safety-switches for the point-shifting switches are lying close behind the respective crossing points, but the contact for the safety-switch for the signal-shifting switches behind the last, a ranging may take place behind the train, in spite of the line being closed. With the sliding-rule system now in use the whole track is closed against ranging until the bar is unlocked by hand.

The actuation of the safety-switches for the signal-shifting switches by the safety switches for the point shifting switches may be effected indirectly or directly. As a rule the shifting takes place on a signal.

The safety switch X, shown in Fig. 1, is, as results from the above, at the same time a safety-switch for the arrival-signal and for the starting-signal, that is to say, the shifting-device for the arrival-signal effects a shifting of the safety switch in one direction if the signal indicates that the track is open for the train. The shifting-device for the starting signal, on the other hand, effects a shifting of the safety-switch in the other direction when the signal passes from the position indicating that the track is clear into the block-signal position.

The safety-switch always breaks that current of the just then reversing shifting-device which serves to put up the signals showing that the line is clear. When the train passed over the arrival signal it was shifted from the open-line signal to the block-signal-position by the contact $m^{35}$. As there is thus formed an interruption in the circuit serving to draw up the arrival-signal into the open-line position, as long as the starting-signal is not put back from the open line to the block-signal position, a train on the track before the starting-signal will be covered. As, on the other hand, the safety switch, on shifting the starting-signal from the open-line into the block signal position, interrupts the circuit of the starting-signal switch, which serves to put this signal on "Line clear," (but as the interruption as well as the closing of the circuits for the arrival- and starting-signals take place alternately) the official before he can give the signal to start to a train in the station must cover the respective track by shifting himself (perhaps by hand) the safety switch.

In Fig. 2 is shown how a track over which trains pass in two directions may be covered by safety-switches. Two safety-switches $X^1$ and $X^{11}$ are used for this. The current formerly led directly from the battery (—pole) to the lever $e$ of the safety-switch X (with which corresponds $X^1$) now passes first over the insulating-contact X of the safety-switch $X^{11}$ to the lever $e$ of the switch $X^1$, from there it travels in the usual manner. The battery-current for the lever $e$ of switch $X^{11}$ is led in the same manner over the insulating-contact X of safety-switch $X^1$. The current over the lever $e$ of $X^1$ can thus only act if $X^{11}$ is in its (—) position; the same applies to the apparatus $X^{11}$ with regard to $X^1$. If therefore a train arrives from one direction and if one of the devices is thereby shifted into the (—) position, the arrival-signal on the other side of the station cannot be put on "Line clear." The same arrangement is made use of if a group of switches is passed over by trains from two directions and the shifting is effected in the same manner. The currents passing over the devices $X^1$ or $X^{11}$ lead in this case to the corresponding safety-switches.

In Fig. 3 of the drawings is illustrated how interdependence may be created between the point-shifting and ranging through a connection of the safety-switches with the shifting-devices without endangering the safety of trains, if these two functions are performed by different persons in different places of the station. $Sr$ represents the switch-board of a ranging-house of a large station. $Sm$ and $Sn$ are contacts corresponding with the distributing-switch $Sz$ of Figs. 1 and 2, which have been intercalated into the circuits of the shifting-devices in a manner that on pressing the contact-buttons $Sm$ the point-shifting-switches are drawn to one side, on pressing on contact-buttons $Sn$ (in the drawing on the same horizontal plane) they are drawn to the other side. With regard to the distributing-switch $Sch$ there is only this difference that it is not necessary to always close the whole left or right contact-group at $Sm$ or $Sn$, but at will, some of the contact-holes 14—19 or $14^1$—$19^1$ or certain groups of the same. V and W are two safety-switches which may be arranged on the switch-board of the train-ranging official, the same as the device X of Fig. 1. V belongs to the shifting-device A, W to the shifting devices D and B of the switches $W^5$ and $W^3$. Devices A and B are shown in Fig. 1, while device or apparatus D is not shown for the reason that it is not to be taken into account in the operation or use of track 111. The connection between A and V on the one side, D B and W on the other side, is effected in the same way as described in explaining Fig. 1. 13 is a contact corresponding with the arrival-signal push $Sch$ of Fig. 1, which is to be pressed down by the ranging-official after closing the contacts $Sm$ or $Sn$ in order to establish a circuit, 12 is a contact in series-connection with each one of the coils $l$ of the safety-switches V and W. As long as this contact 12 is not closed by the ranging-official the station-official cannot shift the apparatus V and W. To contact 12 belongs the same switching-push which is used for the contacts $Sm$, $Sn$; if the official does not range, the push remains in the contact-hole 12. Instead of using one push for several contacts, contact beams may be used, which are interdependent in such a manner that on closing one of the contact-holes $Sm$ or $Sn$ the interruption 12 is opened and vice-versa. At the left in Fig. 3, are shown the terminals of the line-selector $Sz$ illustrated in Fig. 1, so that the operative connection of parts in Fig. 1 may be understood. The conductors $x$, $y$, $u$, lead also to the line-selector, and in fact to the contacts of that track for which the apparatus V and W are provided. The wires leading to the ranging board branch off in multiple connection from the wires of the switching-device at the station Fig. 1, as can be seen from Fig. 3.

Supposing the station official has switched on a track, for instance, track I, on which there is the shifting-device A. Hereby the safety-switch V is shifted in the above-described manner from the (+) into the (−) position and contact c is broken. The circuit is as follows. From the line-selector $Sz$ shown in Fig. 1, through + conductor $z$, contact 12 which is closed by ranging-official, through coil $l$ of apparatus V, contact $b$, lever $e$, terminal $g$, wire $y$ back to line-selector $Sz$. The train-ranger cannot now reverse the shifting device A by closing the respective contacts 14 or $14^1$ and 13 unless the train has passed over contact $m^5$ and put the safety-switch V back into its original position. Exactly the same applies to the shifting devices D and B and the safety-switch W. It is therefore of importance that those leads between the point shifting switches and their safety-switches through which, after shifting the point-shifting switches, the safety-switches belonging to the same are reversed, are led over interruptions which are closed by the track-switch ($Sz$. Fig. 1) of the station official. In this way, after a track has been switched on by a station official, no ranging can take place. Supposing the shifting-device V is in its (+) position the track being therefore not set or arranged for a train.the train-ranger will shift the device A. To this end he presses the push out of the interruption 12 and puts it into the interruption 14 or $14^1$ or he presses down his contact-lever for 14 or $14^1$, whereby contact 12 is broken at the same time. The switch of the shifting device A is in this way shifted in one direction or the other. As long as the contact button or push is not put back in to the interruption 12, or as long as the contact beam for the interruptions 14 or $14^1$ is not in its position of rest, the station official cannot shift the switches and signals of the tracks belonging to the switch of the shifting-device A, which lie behind the safety-switch V, as the current passing from the switchboard of the station-official over the bolt $e$ and the coil $l$ of the safety-switch V, and serving to receive this shifting-device, is interrupted at 12. In this case the station-official is still able to shift the device E. The switches are in parallel or multiple connection and in series connection with the safety switch $St$. The interruption 12 operated by the ranging official may however also be so arranged that it breaks the battery current of the official before it goes to the device X of Fig. 1, so that the station-official cannot shift any switches on the respective tracks.

In Fig. 4 of the drawing is represented the circuit for the securing of a distributing switch $W^6$. This switch may either serve to let the train pass to one station, or from one station to two others. The first case is illustrated in the drawing. There are two safety-switches $Tz^1$ and $Tz^2$ shown in the drawing. They lie in series connection and are switched off in multiple from the safety switch $St$ of the shifting-device $A^1$ for the distributing-switches. Presuming the safety-switch $Tz_1$ to have been shifted by the official of the preceding station into the (+) position shown in the drawing and the arriving train is to be conducted to track III. The official at station B presses down the button of the distributing-switch or line-selector, so that the contacts of $Sz$ shown in Fig. 1 are closed. In the case of Fig. 4 there are arranged besides the line-selector interruptions 1, 2, 3 ..., in Fig. 1 the further interruptions 34, 35, 37 in the line-selector so that on pressing the button of the line-selector all the contacts 34, 35, 37, 1, 2, 3 ... are closed (contacts 30, 31, 33 of Fig. 4 belong to track I). After the line-selector has been plugged and the push button $Sch$ for the arrival-signal, has been pressed, a circuit is formed from the − pole of the battery through lever $e$ of $tz^1$, terminal $g$, contact $a$ −, the push-button of arrival signal $Sch$, interruption 70 to 34 of $Sz$ − to the terminal $i$ of point-shifting switch A, lever $f$, contact $b\ c$, terminal $h$ −, lever $e$ of $St$ contact $a$, − coil $l$ to + pole. Thereby, $St$ is reversed and $A'$ put in safety. A new circuit is now formed from lever $e$, apparatus $St$, contact $b$, terminal $h$ to interruption 35 of $Sz$, to terminal 80, − coil $l$ of $Tz^1$ to + pole. $Tz^1$ is thereby placed in the negative relation, and a circuit is formed from − pole of battery, through lever $e$ of $Tz^1$, contact $b$, terminal $h$, the conductor indicated by dotted line, to apparatus X, lever $e$, and so on as previously described in reference to Fig. 1. If a train is signaled from the opposite direction, since the safety switch $Tz^2$ has been reversed by the station-official of the signaled station, and the approaching train is to be admitted on track III, the switch apparatus $A'$ and corresponding safety device $St$ are reversed and thus a circuit is formed to X and so on as already indicated, whereupon the other apparatuses are set as before described. After $Tz^1$ with $Tz^2$ has been placed back in its original position, a new signal or announcement of a train may be given through station A or C. To put it in a more general way the essential feature of the switching arrangement illustrated in Fig. 4 consists therein that the two safety-switches $Tz^1$ and $Tz^2$, which are connected in multiple with each other, lie in series-connection with the safety-switch $St$ − for the shifting-device $A^1$ of the distributing-switch $W^6$. This connection is such that the safety-switch $St$ on being shifted by the point-shifting-device $A^1$ breaks both currents which serve to reverse the shifting-device $A^1$, while each one of the two safety-switches $Tz^1\ Tz^2$, after being shifted by the safety-switch $St$, breaks that current of the point-shifting device $A^1$ which previously shifted this point-shifting-device. The reversing of the safety-switches $Tz_1\ Tz_2$ is effected by the ringing-off from a preceding station, at either end. The reversing of St by the contact $m^{14}$ behind the switch. By this arrangement of the safety-switches there is gained the advantage that the distributing-switch can only be shifted after the ringing of the bell of the station from which the train starts, and only in the required direction. The switch can only be shifted a second time when the first train has passed the contact $m^{14}$. It can further be seen from Fig. 4 that there is a safety-switch $Tz^1$, $Tz^2$ for each line, which may be connected singly in series with each one of the safety-devices X $X^1$ . . . for the tracks on which trains are to run from that direction, and is thereby so connected with the same that the safety-switches on the track (for instance X) after being shifted through the line-safety switch (for instance $Tz^1$) shifts this switch $Tz^1$, whereby the latter breaks the circuit of the track safety-switch X, according to the above described paths of the currents, a mode of switching which is of great importance for railways with several tracks meeting from the same direction or branching off in different directions. Each line safety-switch $Tz^1$ is therefore so connected with every track-safety switch that the first is a special safety-switch for the second. The contact device serving to reverse each line-safety-switch $Tz^1$ is closed, when a train arrives, by the official of the preceding station on the line, and when a train leaves, by the official of the station from which it leaves. Hereby there is attained that the switches and signals of the line from which a train arrives, or the line on which it leaves, are brought with the switches and signals of the track selected into fixed relations, which cannot be loosened or undone before the train arrives, so that for a line and all the tracks leading to it only one line-selector or rule is required. This makes the switchboard far less confusing. The track-safety device may stand in the already described connections with the safety-switches for the arrival and starting signals or for the distributing-switches.

In Fig. 5 of the drawing the new device is shown in combination with shifting-devices whose parallel circuits are closed by the shifting of road-way slides, or such like, which is called here "connection in multiple" of the shifting-devices. T designates the safety-switch for the two shifting-devices K and J. X a safety-switch and Sch the push for the arrival-signal according to Fig. 1. From each shifting-device there leads in the usual manner, a return-signal to the switch-board of the station official, through which the latter is informed whether the switch or signal was shifted perfectly and the right way. In the circuit of these return signals lie electromagnets 23, 24 which on a current passing through attract armatures which thereby close the contacts 20, 21. The mode of working is as follows: When the official has drawn a road-way slide or closed a line-selector and pressed the push of the arrival-signal, the devices J and K are shifted thereby and the return signal circuit of both apparatus is closed, the two electromagnets 23 and 24 act and attract their armatures. These armatures close the contacts 20 and 21, whereby a new circuit is created (indicated by arrows in the figure) by which the safety-switch T is shifted, the current passing over terminal $g$, lever $e$, contact $a$, coil $l$ to the positive pole. The joint poles of the devices K and J lie, the same as with the former connections on the contact $e$ of safety-switch T, so that the devices J and K cannot be shifted back before the safety switch T has been brought back into its original position. The shifting of the safety-switch T may, at the same time, be utilized for closing the contact 22 by conducting the current through the coils 25, whereby the lever of the electromagnet is attracted. By closing the contact 22 the signals covering the switches may be shifted. In this way it is made certain that a shifting of the signals will only take place when all the switches have been shifted, and their shifting back in consequence of the shifting of safety-switch is no longer possible. On shifting the signal there is shifted, as already described, the safety-switch X.

Figs. 6 and 7 show in what manner locks and safety-switches can be locked or stopped. 26 is an indicator of the usual system which, with mechanical point-shifting switches, indicates the position of the arrival-signal at any time. 27, 28 are contacts of the indicator which are connected by a wire with the locking device L. This locking-device L is shown separately in Fig. 7 in connection with the shifting-device 21. The safety-switch U is so intercalated into the circuit that it is shifted, after the locking-device L has been set in action, and breaks the circuit of the locking-device, so that the latter cannot be shifted back before safety-switch U, by closing the contact $m^{14}$ through the train, has been brought back into its former position. The locking of the adjusting lever 21 is therefore secured by the device U. A second safety-switch U' serves to break the circuit of the index of the indicator 26. The mode of working is as follows: After the switches of the road-way have been pulled (by controlling rule or the like) the signal, "Line clear", is put on. At device 26, the index points to the image corresponding with the position of the arrival signal, contact 28 is closed thereby, and the following circuit is formed: from battery + pole to the insulating lever $x$ of device U' index of device 26, contact 28 — to device L, lever $e$, contact $a$, coil $l$, — pole (which may be put to earth.) Device L is thereby shifted, and locks the shifting-device 21 (Fig. 7) and a new circuit is formed over lever e, of device L, contact b— to safety-switch U, lever e, contact a, coil l, — pole. Hereby safety-switch U is shifted, and a new circuit is formed over lever e of device U, contact b, to safety-switch U', lever e, contact a, coil l, — pole. Hereby the safety-switch U' is shifted. By the shifting of device U, the circuit, by which the device L can be put back, is broken at f, c of device U; by the shifting of device U' the circuit is broken at x a', which leads to the index of the indicator 26. If the train enters the station, he overbridges the contact $m^{14}$ and a circuit is formed: + pole, track-contact $m^{14}$, coil m of device U, contact d, f, — pole. The device U is hereby put back into the position of Fig. 6. If now the index is put into the "stop" position, contact 27 therefore closed, the locking device L cannot yet be put back into the + position, before the train has passed the track-contact $m^{15}$. Hereby the device U' is brought back into the + position, as a circuit is formed from — pole, coil m, contact d, f, track-contact $m^{15}$, + pole. After the shifting back of device U' into its + position, a new circuit is formed from + pole, insulated lever x of device U', contact index of indicator 26, contact 27, lever f of the locking-device L, contact d, coil m, device U, contact c, lever f, — pole. Device L is thereby shifted back into the position of Fig. 6. The track contact $m^{15}$ lies behind the contact $m^{14}$. This locking system may be applied to the most different shifting devices and crossing points, shown in Figs. 1 and 2. This locking system has the advantage that even if the road-way rule is drawn back a too early shifting of switches is prevented. The official cannot therefore shift the point-switch before the last carriage of the first train has passed it. But he can use switches, over which the train has passed, at once for other purposes, though, the train is still on the track, which greatly facilitates the movement of the trains in large stations.

In Fig. 8 of the drawing this new device is illustrated in its application to the block-system. $S^1$, $S^2$ are two signals on the open line. M is the shifting-device for the signal $S^1$, N the shifting device for the signal $S^2$. In the present case two signals $S^1$ and $S^2$ are represented, but there may also be only one or any number. O is a safety-switch for all starting-signals in this direction, which is preferably arranged on the switch-board of that station from which the train leaves and which is shifted (which the officials see from the disappearance of an indicator or other device) when the train has passed the starting-signal (with contact $m^{13}$.) P is a similar safety-switch on the switch-board of the arrival station. This one is also shifted and thereby secures the shifting device N of the signal $S^2$ against being shifted into the (—) position and announces, at the same time, the approach of a train to the official, when the train has passed the last block-signal on the line. S and R are safety-switches; safety-switch R, which preferably stands near the signal $S^2$, secures the shifting-device M of the signal $S^1$, and safety-switch S near the signal $S^1$ secures the safety-switch O on the switch-board (or a preceding block shifting device). $m^{13}$ to $m^8$ are rail-switches to be closed by the last carriage of the train. The switching is so arranged that the train, when it has passed a signal puts that signal on "Stop," if a train passes over the first contact $m^{13}$ all the signals between two stations or the starting-station and the last signal locked by the train are put on "Line clear". The working will be seen from the paths of the current. Supposing the train leaves the station and passes over contact $m^{13}$. A circuit is then formed, over different preceding devices actuating, say for instance, starting-signals, from contact $m^{13}$ (that is to say the negative pole) to device O, lever e, contact a coil l, positive pole; lever e is shifted and a new circuit formed from lever e to device O over contact b—safety-switch S, lever e coil l to the positive pole. Safety-switch S is shifted and a new circuit formed: lever e, device S, contact b—device M, lever e, contact a, coil l—safety-switch R, lever $X^1$ to the positive pole. The signal switch M is thereby shifted and the signal brought into the "line clear" position. A new circuit is formed over lever e, contact b—, device R, lever e etc. so that the safety-switch N and safety-switch P are shifted. Supposing the train arrives at signal $S^1$ and closes contact $m^9$. A circuit is then formed over lever f, the device M which is in the (—) position, contact d, coil m to the positive pole, whereby the device M is shifted back into the (+) position and the signal $S^1$ is also shifted into the "stop" position. A new circuit is formed thereby from lever f of the device M over contact c—to safety-switch S which is in the (—) position, lever f, contact d, coil m to the positive pole, so that this device is shifted back into its (+) position. A new circuit is formed: lever f, safety switch S, contact c—to coil m of the safety switch-board o contact d, lever f to positive pole. The switch board device O is shifted which shows the official that the line between the first block-signal and the station is clear and the starting signals may be put on "Line clear". The train now moves up to contact $m^{11}$ and bridges the same. A circuit is formed thereby from $m^{11}$ to the device N, lever f, contact d, coil m to the positive pole. Device N is shifted into its (+) position and a new circuit is formed over lever f of the device N, contact c,— safety switch R, lever f, contact d coil m to the positive pole. The safety-switch R is thereby shifted back into its original position. By the shifting of the device P into the (−) position, in consequence of bridging contact $m^{13}$, the official of the arrival-station was informed that the train has left the starting-station. On the train passing over the contact $m^8$ the switchboard device P is shifted back into its original (+) position. Practically the circuit may be such that the current does not pass directly from contact $m^8$ to the lever $f$ but first over the shifting-devices of the arrival-signals, so that the official, by the shifting of the device P is, at the same time, informed that the arrival-signal, which was showing "Line clear," is now on "Stop", and that the train has passed this signal. The arrival-signal lies in this case between contact $m^{11}$ and contact $m^8$.

What is of special importance with regard to the above described switching-system is the fact that when a train is standing between two block-signals (for instance between $S^1$ and $S^2$) and the next train has passed contact $m^{13}$, the last signal $S^1$ is thereby not brought into the "line clear" position, so that the next train must stop before the same. The circuits formed are then as follows: As long as the train has not passed contact $m^{11}$, safety-switches R and N are not shifted back, but stand in the (−) position. If the following train passes over contact $m^{13}$, and if thereby contact $d$ of the device O and contacts $b$ of safety-switch S is closed, the above described circuit: safety-switch S, contact $b$, device M, lever $e$, contact $a$, coil $l$, safety-switch R, contact $X^1$, positive pole, cannot be formed, as contact X is broken. The second train must therefore stop before the signal $S^1$. If the first train passes over contact $m^{11}$, it shifts the devices N and R, the device S had already been shifted into the (−) position by the following train, and a circuit is formed from $m^{11}$ over lever $f$ of the device N, contact $d$, coil $m$ to the positive pole, whereby M is shifted into the + position and the signal is put on "Stop." Hereby a new circuit is formed from lever $f$ of the device N over contact $c$ to lever $f$ of the device R, contact $d$, coil $m$ to the positive pole, whereby R is shifted back into the + position. Until now the device $m$ could not be shifted, as the interruption $X^1$ of device S no longer breaks the current leading to coil $l$ of the device M. Through the shifting of the device R a new circuit is formed over lever $f$, contact $c$ of the device R to lever $x$ of the device S, contact $b$, device M, lever $e$, contact $a$ coil $l$ over contact $X^1$ of the device R to the positive pole; the device M is now reversed and the signal $S^1$ put on "Line clear," so that the second train can proceed, $m^{10}$, $m^{12}$ are the contacts on the line, between each shifting-device and its safety switch. They break the current serving to shift the safety-switch, so that the putting of the signals on "Line clear" can not be effected at one time for the whole line, but only gradually, as the lead from the contact $b$ of the shifting-device to the connection with the rail-switches $m^{10}$ and $m^{12}$ (indicated by a dotted line) is wanting. Otherwise the circuit and working remain unchanged.

To express it more generally the essential feature of the switching-system explained by the above detailed description of the circuits consists in the following: A shifting of the first block-signal $S^1$ to "Line clear" can only take place if the train has passed the second block-signal $S^2$ and put it on "Stop," as for the shifting-apparatus M for each block-signal $S^1$ there is provided a safety-switch R, which is shifted by the shifting-device M, when it puts the block-signal on "Line clear" and thereby breaks the current serving to put the block-signal on "Line clear" (the − position). With the shifting device N of the next block-signal $S^2$ this safety-switch stands in such a connection that on being shifted it shifts the device N, and the latter thereby breaks the circuit required for reversing R. The shifting-device N is therefore a safety-switch for the device R. Contact $m^{11}$ for reversing the device R must be arranged near the second signal $S^2$, and is, at the same time, the contact for reversing the shifting device N. That a train preceding another, after having covered itself, opens the line to the next train is effected by the arrangement that the circuit serving to put the device M of block $S^1$ into the "line clear" position is led over the safety-switch R of this block-signal, the safety-switch S of the preceding block-signal (which we will call SO) and the contact $m^{11}$ serving to shift back the safety-switch R into its original (the +) position, in such a manner that when the safety-switch S is put into the (−) position and the safety-switch R into the (+) position, by bridging the contact $m^{11}$, the circuit of the lead is closed, so that the shifting-device M draws the block-signal $S^1$ into the "line clear" position.

By this peculiar intercalation of safety-switches the following advantages are gained.

1. The section of the line between the station and the first block cannot be opened if a train is on the same.

2. The block lying behind a train is automatically secured until the next block is passed over and put on "Stop".

3. A block behind a train which is secured as per point 2 is automatically put on "Line clear", if the following train has passed on the section leading to this block and if the preceding train has passed over the next block-signal and put it on "Stop."

4. Each train puts the signal over which it passes on "Stop" and the following one only on "Line clear" if the section of the line behind it is clear.

What we claim as our invention and desire to secure by United States Letters Patent is—

1. In switch and signal operating apparatus, the combination of a shifting device to be secured in safety position, an electrical circuit having a contact which is closed by operation of such shifting device, and a safety switch device which is automatically operated by the closing of said contact, the circuit between such shifting device and safety switch being automatically broken when the latter is operated, substantially as shown and described.

2. In switch and signal operating apparatus, the combination of a point-shifting device, which is to be put in position to be secured, a safety switch device on which the shifting device acts, an electrical circuit including the said devices, the same having a contact which is closed automatically by the point-shifting device when operated, whereby the safety switch is in turn operated, the latter during the shifting movement breaking the circuit of the point-shifting device whereby the placing of same in a dangerous position is avoided, substantially as described.

3. Means for securing electric shifting-devices for point shifting-switches and signals, the same consisting in electrically-connected shifting devices, and safety-switches, having contacts by which, when closed, the switches may be brought back into their initial position with the shifting-devices to be secured; the safety-switches, after the shifting-devices to be secured have been properly adjusted, being worked by the latter, whereby the circuit including the shifting-devices and by which a dangerous working might be effected, is broken, substantially as set forth.

4. Means for securing electric shifting devices for point-shifting switches and signals which include in an electric circuit the arrival-signal and the starting signal of a line having one safety-switch (Fig. 1) in common, which is so connected with the shifting devices for the signals that the shifting-device for the arrival signal, after this signal has been put into the "line clear" position, causes a shifting of the safety switch in one direction, and the shifting-device for the starting-signal, when this signal has been shifted from the "line clear" into the "stop" position, a shifting of the safety-device in the other direction, while the safety-switch always breaks that current of the shifting-device by which it has been shifted into the "line clear" position, whereby the arrival signal cannot be put back into the "line clear" position if the track is obstructed, substantially as set forth.

5. Means for securing electric shifting-devices for point-shifting switches and signals including in an electrical circuit two safety-switches ($X^1$ $X^1$, Fig. 2) for a line on which trains run in both directions, each one of the leads serving to shift the arrival into the "line clear" position being connected with the other safety-switch so that on shifting these safety-switches the current is broken, by which it results that both signals can never be shifted at the same time, substantially as set forth.

6. Means for securing electric shifting-devices for point shifting switches and signals, including in an electrical circuit the safety-switch (X, Fig. 1) for the arrival signal of one line which is connected with one or several safety-switches (Z Y Fig. 1) for the dangerous switches of branch lines or crossing lines as described, whereby the safety-switch (X) for the signals, after shifting the safety-switches Z Y is shifted by the latter and thereby breaks those currents of the safety-switches for the point-shifting devices by which the shifting of the latter was effected, while the contact-devices ($M^4$ $M^1$) allowing the reversing of the safety-switches for the point shifting switches are arranged, according to the switches to which they belong, with reference to the direction of the train, the contact device for the safety-switch for the signals being arranged, however, according to the last switch or the danger-switch of the line, whereby it results that the switches in front of the train are always locked and cannot be shifted, but that the switches behind the train can be shifted on the track being locked, substantially as set forth.

7. Means for securing electric shifting-devices for point shifting-switches and signals, the same including in an electric circuit the safety switch (St Fig. 4) and the shifting-device ($A^1$) with which it is connected, a distributing-switch ($W_6$), two multiple connected safety-switches ($Tz_1$, $Tz_2$) being arranged as described, so that the first safety-switch (St) after being shifted by the point-switch A breaks both circuits by which the latter is shifted while each of the other safety-devices (Fig. $Tz_1$ $Tz_2$) after being shifted by means of the first safety-switch St breaks that current of the point-switch $A^1$ which previously shifted the point-switch, the reversing of any of the series-connected safety-switches ($Tz_1$ $Tz_2$) being effected by the ringing-off from any preceding station, the reversing of the third safety-switch St by the closing of a contact $m^{14}$ nearest to the switch, with regard to the direction of the train whereby the distributing-switch can only be shifted after the ringing-off from the starting station and only in the required direction and a further shifting of the point-switch can only take place when the train has passed, substantially as set forth.

8. Means for securing electric shifting-devices for point shifting switches and signals, the same including in electric circuit several tracks in the same direction or branching off in different directions, a safety-switch ($Tz_1$ $Tz_2$, Fig. 4) for each of such tracks, which may be singly connected in series with each of the safety-switches ($X$ $X_1$) for the tracks on which trains start from this point and is thereby so connected with the same that the track safety-switch X, after being reversed by the line safety switch, reverses the line safety switch ($Tz_1$ $Tz_2$) and that the line safety switch breaks the circuit of the track safety-switch, the contact device serving to reverse the line safety switch may be so arranged that for arriving trains it is closed by the official of the preceding station, for departing trains by the official of the starting-station, whereby it results that the point-switches and signals of the line on which a train arrives or leaves are brought into a firm, immovable connection with the switches and signals of the track selected which cannot be dissolved or loosened before the arrival, or the starting, of a train, so that for a line and all the tracks connected with it only one line-selector (or rule) is required, substantially as set forth.

9. In apparatus for securing electric point-switches signal-switches and locking-devices, the combination in an electric circuit of safety shifting devices to be secured, in combination with safety switches which latter break the dangerous leads of the shifting devices, said switches being shifted by the return signal currents of the devices to be secured, whereby the use of safety-switches of a connection in multiple is made possible, substantially as set forth.

10. In apparatus for securing electric signal shifting devices, the combination with block signals, switches and shifting devices, in electric circuit, of a safety-switch R for each block signal $z_1$, which switch when the block-signal is put on "Line clear" by the shifting-device M, breaks the current serving to put the block-signal in "Line clear" (for the − position) and is connected with the shifting-device N of the next block signal $S_2$ as described, whereby on being shifted it shifts the shifting-device N and the latter thereupon breaks the circuit serving to shift back the safety-switch R, the contact $m_{11}$ serving to shift back the safety-switch R being arranged near the second signal $S_2$ and being at the same time the contact for reversing the second shifting-device N, whereby the first block-signal $S_1$ can be put on "Line clear" only then when the train has passed the second block-signal $S_2$ and is put on "Stop", substantially as set forth.

11. In apparatus for securing electric signal switching-devices, the combination with block signals, shifting devices and safety switches all in electric circuit, the block $S_1$ shifting device M being put into the "line clear" position by a second current led in such a manner over the safety-switch R of this block-signal, the safety switch S of the preceding block signal $S_0$ and the contact $m_{11}$ serving to shift back the safety-switch R into its − position, so that when the safety switch S is in the − position and the safety-switch R is shifted back into the + position by bridging over the contact $m_1$ the circuit of this lead is closed so that the shifting device M draws the block-signal $S_1$ into the "line clear" position, whereby a preceding train after it has covered itself makes the block-section of the line free for an immediately following train, substantially as set forth.

12. In apparatus for securing electric locking devices of switches, the combination of the locking device L (Fig. 6) for the dangerous switches or groups of switches and one or several safety-switches covering the same, which devices and switches are connected with the arrival and starting signal of the track as described, so that by putting the signal on "Line free" the circuit putting the locking device into the closed position (or the circuits) is closed, while the closing of the circuit (or of the circuits) shifting back the locking devices, after shifting the signal into the "stop" position and after shifting the safety switches through rail-contacts lying behind the point-switches (with regard to the direction in which the train moves) whereby a premature shifting of switches is prevented, while the releasing of switches, singly or in groups is possible immediately the train has passed, substantially as set forth.

13. A safety shifting apparatus of the character indicated, the same comprising an electric circuit, a signaling device and a rule device, two safety shifting devices, which by changing of the signal from the stop position to train moving position, the first safety shifting device U breaking the circuit of the rule device L, while the second U' breaking the signal working circuit whereby the rail contact $m^{15}$ which serves to reverse the second apparatus U' lies behind the rail contact $m^{14}$ of the first device U, substantially as described.

14. In apparatus for securing electric point-switches, signal-shifting, and locking-devices in which apparatus the switches to be shifted along a section of a line can be shifted by the station official only simultaneously or all at once, and by the train-ranger singly or in groups (Figs. 1 and 2), the leads between the point-switches and their safety-switches being arranged as described, by which, after shifting of the point-switches, the respective safety-switches are shifted, are led over interruptions to be closed by the track-switch of the station, official, whereby, when the station, official has opened a track, no train-ranging can take place, substantially as and for the purpose set forth.

In testimony whereof we have signed our names to this specification in the presence of two subscribing witnesses.

LORENZ KOTTMAIR.
RUDOLF ZWACK.

Witnesses:
CHURCHILL HARVEY-ELDER,
ULYSSES J. BYWATER.